(12) United States Patent
Asafusa et al.

(10) Patent No.: US 12,514,539 B2
(45) Date of Patent: *Jan. 6, 2026

(54) ULTRASOUND DIAGNOSTIC APPARATUS

(71) Applicant: FUJIFILM Corporation, Tokyo (JP)

(72) Inventors: Katsunori Asafusa, Chiba (JP); Tomofumi Nishiura, Chiba (JP); Eiji Kasahara, Chiba (JP); Tomoaki Chono, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,907

(22) Filed: Feb. 9, 2024

(65) Prior Publication Data

US 2024/0277311 A1 Aug. 22, 2024

(30) Foreign Application Priority Data

Feb. 17, 2023 (JP) .............................. JP2023-023533

(51) Int. Cl.
*A61B 8/08* (2006.01)
*A61B 8/00* (2006.01)
*G16H 50/20* (2018.01)

(52) U.S. Cl.
CPC ............ *A61B 8/085* (2013.01); *A61B 8/0825* (2013.01); *A61B 8/461* (2013.01); *A61B 8/54* (2013.01); *G16H 50/20* (2018.01)

(58) Field of Classification Search
CPC ....... A61B 8/085; A61B 8/0825; A61B 8/461; A61B 8/54; A61B 8/463; A61B 8/485;

(Continued)

(56) References Cited

U.S. PATENT DOCUMENTS

2006/0052702 A1\* 3/2006 Matsumura ......... G01S 7/52042
600/443
2020/0170624 A1\* 6/2020 Noguchi .............. G06V 10/443
(Continued)

FOREIGN PATENT DOCUMENTS

JP H06-9563 B2 2/1994
JP 2003-000575 A 1/2003
(Continued)

OTHER PUBLICATIONS

H. Berment et al., "Masses in mammography: What are the underlying anatomopathological lesions?", (2014) Diagnostic and Interventional Imaging, 95, pp. 124-133. (Year: 2014).*

(Continued)

*Primary Examiner* — Kaitlyn E Sebastian
(74) *Attorney, Agent, or Firm* — Paul Teng

(57) ABSTRACT

An ultrasound diagnostic apparatus includes an ultrasound transmission and reception unit that transmits and receives ultrasound waves to and from a subject and that generates a reception signal, an ultrasound information generation unit that generates a plurality of types of ultrasound information based on the reception signal, a detection and measurement unit that detects and measures a lesion based on the plurality of types of ultrasound information, and a lesion/risk information analysis unit that analyzes a state of the lesion based on a measurement result obtained by the detection and measurement unit. The detection and measurement unit includes at least one of a set of a mass lesion detection unit and a mass lesion measurement unit, or a set of a calcified lesion detection unit and a calcified lesion measurement unit.

15 Claims, 12 Drawing Sheets

(58) Field of Classification Search
CPC ..... A61B 8/5207; A61B 8/5223; A61B 8/481; A61B 8/52; G16H 50/20; G16H 50/30
See application file for complete search history.

(56) References Cited

U.S. PATENT DOCUMENTS

| | | |
|---|---|---|
| 2020/0187909 A1 | 6/2020 | Yoshikawa |
| 2022/0254490 A1* | 8/2022 | Addanki ................ G16H 50/30 |
| 2024/0277318 A1 | 8/2024 | Asafusa et al. |

FOREIGN PATENT DOCUMENTS

| | | |
|---|---|---|
| JP | 3639364 B2 | 4/2005 |
| JP | 3932482 B2 | 6/2007 |
| JP | 5060141 B2 | 10/2012 |
| JP | 5680703 B2 | 3/2015 |
| JP | 57473772 | 5/2015 |
| JP | 5747377 B2 | 7/2015 |
| JP | 6356528 B2 | 7/2018 |
| JP | 2020-081742 A | 6/2020 |
| JP | 2020-192068 A | 12/2020 |
| JP | 6996035 B2 | 1/2022 |

OTHER PUBLICATIONS

A. Allegretto, "AI helps predict which DCIS patients need to be upstaged" (Jan. 5, 2022) https://www.auntminnie.com/clinical-news/womens-imaging/breast/article/15630142/ai-helps- predict-which-dcis-patients-need-to-be-upstaged.
S. Lee et al., "Radiomics in Breast Imaging from Techniques to Clinical Applications: A Review", Korean J Radiol, 21(7):779-792 (2020).
Masatoshi Kudo et al., "Response Evaluation Criteria in Cancer of the Liver", Japan Society of Hepatology (2021).
"Ultrasound Diagnostic Standards for Liver Masses", Jpn J Med Ultrasonics vol. 39 No. 3 (2012).
"Contrast-enhanced ultrasound diagnosis of liver tumors differential diagnosis", INNERVISION (28•3) 2013.
"Ultrasound elastography diagnostic guidelines: Liver", Japanese Society of Ultrasonics in Medicine (2013).
"Abdominal Ultrasound Medical Examination Judgment Manual", Japanese Gastrointestinal Cancer Screening (2021).
'Aiming to realize the ultimate cancer diagnosis support AI "multimodal AI"', Nikkei Business Publications, Inc. (2021).
U.S. Appl. No. 18/437,958, filed Feb. 9, 2024 US 2024/0277318 A1 (published Aug. 22, 2024).

* cited by examiner

ULTRASOUND DIAGNOSTIC APPARATUS

CROSS-REFERENCE TO RELATED APPLICATION

The present application claims priority from Japanese Patent Application No. 2023-023533 filed with the Japanese Patent Office on Feb. 17, 2023, the content of which is hereby incorporated by reference into this application.

BACKGROUND OF THE INVENTION

1. Field of the Invention

The present disclosure relates to an ultrasound diagnostic apparatus, and particularly, to an apparatus that analyzes a state of a lesion.

2. Description of the Related Art

The presence or absence of cancer or tumors suspected to be cancerous, and the like have been diagnosed using an ultrasound diagnostic apparatus. In the diagnosis, a comprehensive diagnosis result based on a diagnostic guideline and experience is derived based on a plurality of types of information obtained from the ultrasound diagnostic apparatus (hereinafter, referred to as ultrasound information). Diagnosis includes the detection of precancerous lesions and non-invasive cancers, and the prediction of their progression to invasive cancer. The diagnostic guideline is established by each country or region and indicates evaluation items, determination criteria, and classifications with respect to the lesion.

JP2003-575A describes an image diagnosis support system that processes a plurality of pieces of data of a site to be examined of a subject imaged by different imaging apparatuses and that generates determination data for benignity or malignancy of the site to be examined. JP2020-192068A describes an image diagnosis support apparatus that discriminates diseases based on a plurality of types of measured values at a plurality of positions within a living body.

SUMMARY OF THE INVENTION

In the conventional diagnosis using an ultrasound diagnostic apparatus, it is necessary to detect pathological changes in biological tissues, anatomical characteristic changes, and the like (hereinafter, referred to as a lesion) from within a vast amount of medical information, and an effort required to obtain a diagnosis result is substantial. In addition, there are cases where making an objective judgment about similar feature changes may be difficult.

An object of the present disclosure is to reduce an effort required to obtain a diagnosis result for a lesion, and to enhance objectivity of the diagnosis result, to provide diagnostic support.

According to the present disclosure, there is provided an ultrasound diagnostic apparatus comprising: an ultrasound information generation unit that generates a plurality of types of ultrasound information based on transmission and reception of ultrasound waves with respect to a subject; a detection and measurement unit that detects and measures a lesion based on the plurality of types of ultrasound information; and an analysis unit that analyzes a state of the lesion based on a measurement result obtained by the detection and measurement unit, in which the detection and measurement unit detects and measures at least one of a precancerous lesion or a breast cancer as the lesion, and the analysis unit analyzes a state of at least one of the precancerous lesion or the breast cancer as the lesion.

In one embodiment, the detection and measurement unit includes at least one of a mass lesion detection and measurement unit that detects and measures a mass lesion, or a calcified lesion detection and measurement unit that detects and measures a calcified lesion.

In one embodiment, the ultrasound information includes a plurality of types of ultrasound image data generated in different modes, and the analysis unit analyzes the state of the lesion by applying the plurality of types of ultrasound image data to a learning model constructed in advance.

In one embodiment, the analysis unit analyzes the state of the lesion based on at least one of a LUT (look-up table) calculation unit that analyzes the state of the lesion based on a look-up table acquired in advance, or a machine learning analysis unit that analyzes the state of the lesion based on a learning model constructed in advance.

In one embodiment, the analysis unit performs progression degree prediction of the lesion.

In one embodiment, a display controller is further provided, and the display controller displays the progression degree prediction of the lesion on a display unit, or displays the progression degree prediction of the lesion and a cause leading to the prediction on the display unit.

In one embodiment, the analysis unit performs determination on a treatment effect and further performs prediction on a treatment progress.

In one embodiment, a display controller is further provided, and the display controller displays information obtained by performing determination on the treatment effect and further performing prediction on the treatment progress on a display unit, or displays, on the display unit, the information obtained by performing determination on the treatment effect and performing prediction on the treatment progress, and a cause leading to the determination of the treatment effect and to the prediction of the treatment progress.

In one embodiment, the ultrasound information includes data indicating at least one of a B-mode image, a tissue harmonic image, a tissue elastography image, a share wave elastography image, an attenuation image, or a color flow image.

According to the present disclosure, it is possible to reduce an effort required to obtain a diagnosis result for a lesion, and to enhance objectivity of the diagnosis result, to provide diagnostic support.

DESCRIPTION OF THE PREFERRED EMBODIMENTS

Figure 1:
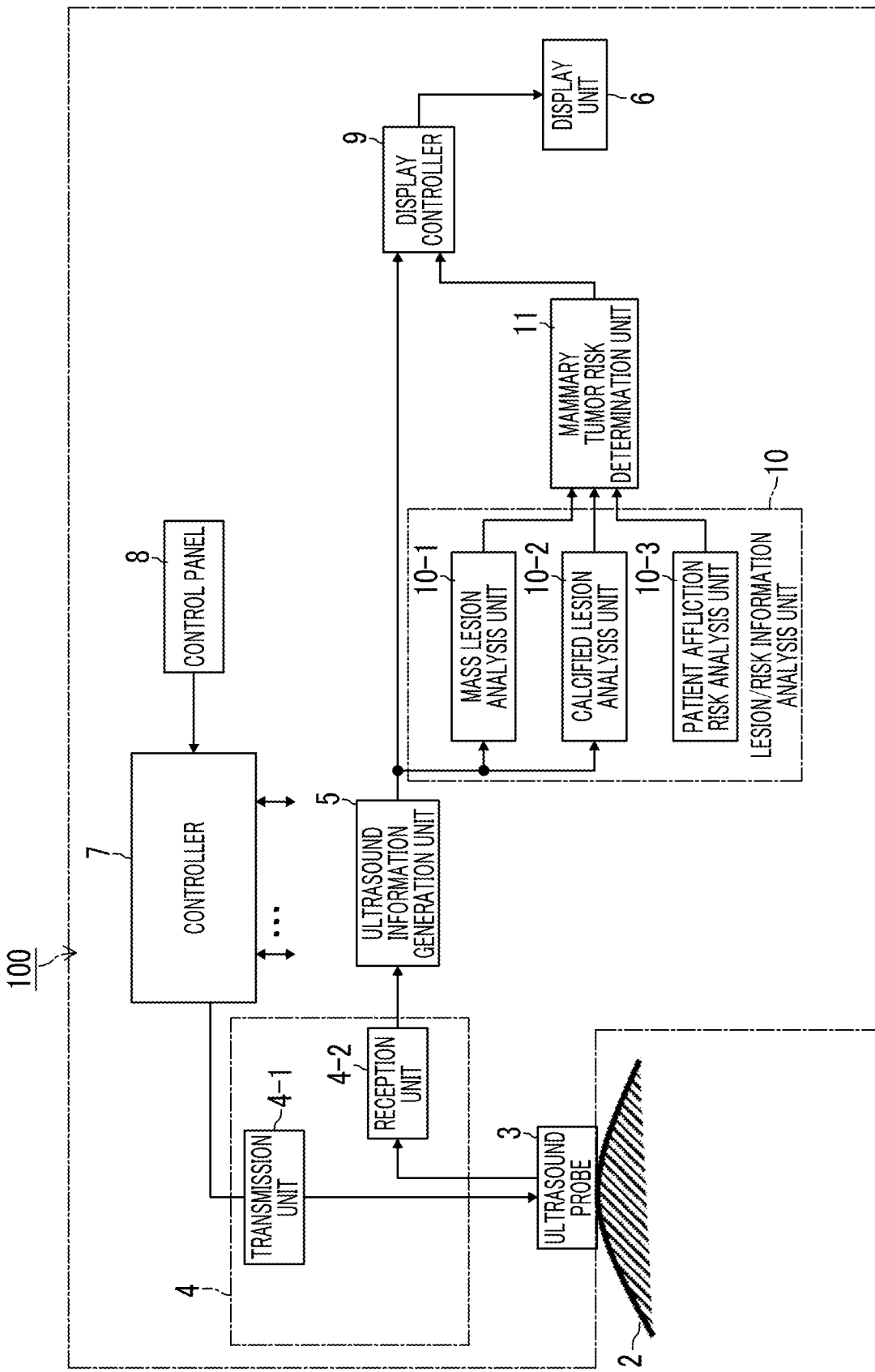
FIG. 1 is a diagram showing a configuration of an ultrasound diagnostic apparatus according to an embodiment of the present disclosure.

An embodiment of the present disclosure will be described with reference to each drawing. The same components shown in a plurality of drawings are designated by the same reference numerals, and the description thereof will not be repeated. FIG. 1 shows a configuration of an ultrasound diagnostic apparatus 100 according to the embodiment of the present disclosure. The ultrasound diagnostic apparatus 100 comprises an ultrasound probe 3, an ultrasound transmission and reception unit 4, an ultrasound information generation unit 5, a display unit 6, a controller 7, a control panel 8, a display controller 9, a lesion/risk information analysis unit 10, and a mammary tumor risk determination unit 11.

The ultrasound information generation unit 5, the lesion/risk information analysis unit 10, the mammary tumor risk determination unit 11, the display controller 9, and the controller 7 may be configured by processors as hardware. A processor that configures each of the ultrasound information generation unit 5, the lesion/risk information analysis unit 10, the mammary tumor risk determination unit 11, the display controller 9, and the controller 7 implements each function by executing a program. The processor may comprise a memory that stores the program. In addition, the memory that stores the program may be provided outside the processor.

The controller 7 may perform overall control of the ultrasound diagnostic apparatus 100. Additionally, the control panel 8 may generate command information for the ultrasound diagnostic apparatus 100 in response to an operation of a user such as a doctor or an operator, and the controller 7 may control each component of the ultrasound diagnostic apparatus 100 according to the command information acquired from the control panel 8.

The ultrasound transmission and reception unit 4 comprises a transmission unit 4-1 and a reception unit 4-2. The ultrasound probe 3 comprises a plurality of ultrasound transducers. The transmission unit 4-1 outputs a transmission signal to each ultrasound transducer provided in the ultrasound probe 3 in accordance with the control by the controller 7. Each ultrasound transducer converts the transmission signal into an ultrasound wave and transmits the ultrasound wave to a subject 2. The controller 7 controls a delay time of the transmission signal output to each of the plurality of ultrasound transducers, so that a transmission beam is formed from the ultrasound probe 3 toward a specific direction. The subject 2 may be scanned with the transmission beam.

Each ultrasound transducer provided in the ultrasound probe 3 receives the ultrasound wave reflected by the subject 2, converts the reflected ultrasound wave into an electrical signal, and outputs the electrical signal to the reception unit 4-2. The reception unit 4-2 generates a reception signal by phase-adding the electrical signals output from respective ultrasound transducers, and outputs the reception signal to the ultrasound information generation unit 5. In the phase addition, the controller 7 adjusts a delay time of the electrical signal output from each ultrasound transducer, so that the reception signals are generated such that the electrical signals based on the ultrasound waves received from the direction of the transmission beam reinforce each other.

The ultrasound information generation unit 5 generates ultrasound image data and ultrasound measurement information based on the reception signals output from the reception unit 4-2 and outputs the ultrasound image data and the ultrasound measurement information to the lesion/risk information analysis unit 10 and the display controller 9. Here, the ultrasound measurement information may be information based on numerical values or the like indicating a measurement result.

The ultrasound probe 3, the ultrasound transmission and reception unit 4, the ultrasound information generation unit 5, and the controller 7 operate in various modes, such as a mode for generating B-mode image data (tomographic image data), a mode for generating elastography image data (image data indicating an elastic modulus distribution), a mode for generating tissue harmonic image data (image data based on harmonic components of reflected waves), and a mode for generating color Doppler image data. The reception signal corresponding to each mode is output from the ultrasound transmission and reception unit 4 to the ultrasound information generation unit 5. The ultrasound information generation unit 5 generates the ultrasound image data and the ultrasound measurement information generated according to each mode and outputs the ultrasound image data and the ultrasound measurement information to the lesion/risk information analysis unit 10 and the display controller 9.

Figure 2:
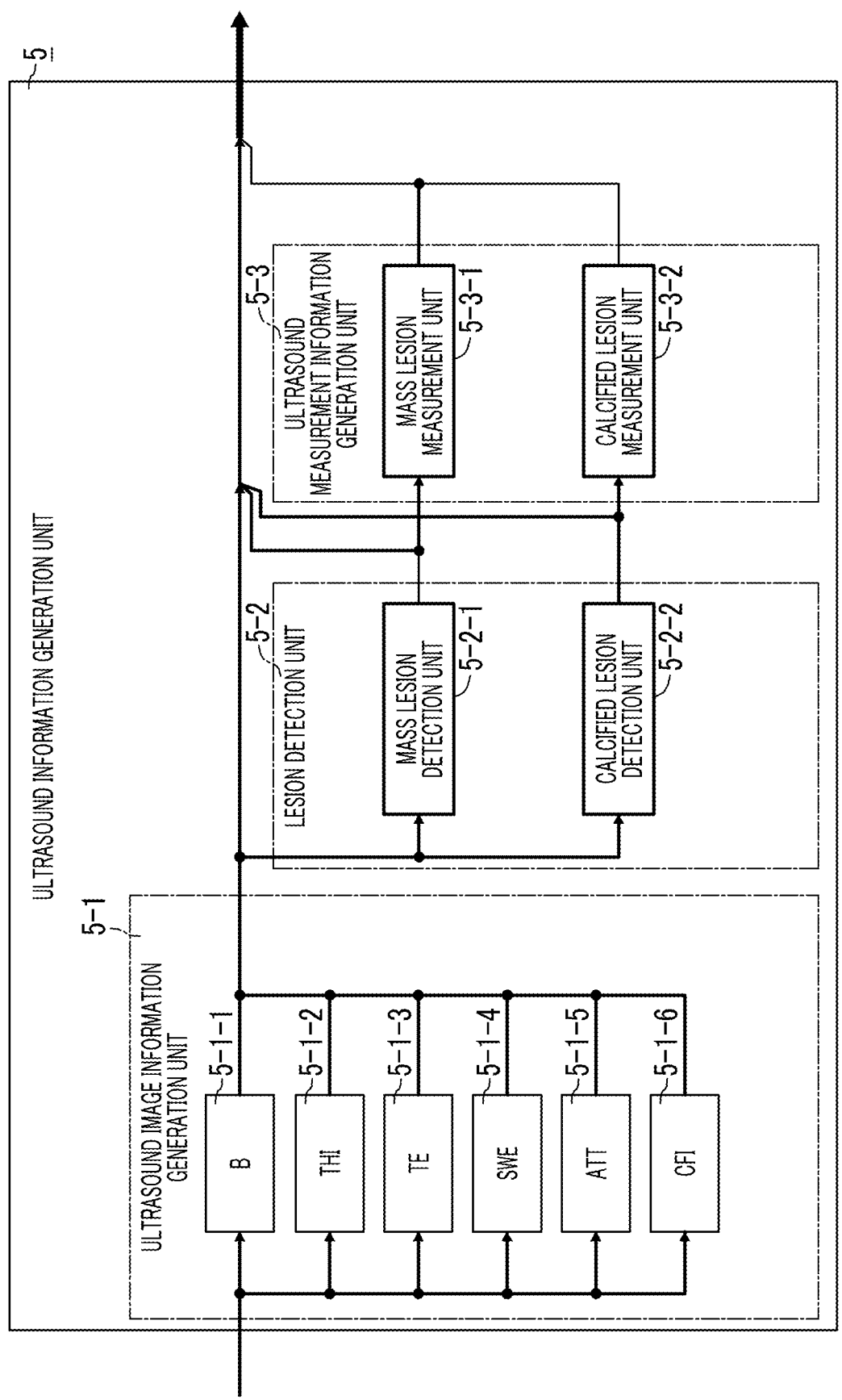
FIG. 2 is a diagram showing a configuration of an ultrasound information generation unit.

FIG. 2 shows the configuration of the ultrasound information generation unit 5. The ultrasound information generation unit 5 comprises an ultrasound image information generation unit 5-1, a lesion detection unit 5-2, and an ultrasound measurement information generation unit 5-3.

The ultrasound image information generation unit 5-1 comprises a B-mode image generation unit 5-1-1 (noted as B in the drawing), a tissue harmonic image generation unit 5-1-2 (noted as THI in the drawing), a tissue elastography image generation unit 5-1-3 (noted as TE in the drawing), a share wave elastography image generation unit 5-1-4 (noted as SWE in the drawing), an attenuation image generation unit 5-1-5 (noted as ATT in the drawing), and a color flow image generation unit 5-1-6 (noted as CFI in the drawing).

The B-mode image generation unit 5-1-1 generates B-mode image data representing a B-mode image in which reflected echo intensity (intensity of reflected ultrasound waves) is converted into brightness, and B-mode information (tissue distribution information, tissue shape information, and the like). The tissue harmonic image generation unit 5-1-2 generates tissue harmonic image data in which, in addition to the reflected echo intensity, the intensity of echoes that have non-linearly propagated in a living body is converted into brightness, and tissue harmonic information (tissue distribution information, shape information, and the like). The tissue elastography image generation unit 5-1-3 generates a displacement amount of the living body due to external pressure and strain image data in which the displacement amount is displayed with color. The share wave elastography image generation unit 5-1-4 generates a biological elastic modulus due to shear waves generated by ultrasonic radiation and share wave image data based on the biological elastic modulus. The attenuation image generation unit 5-1-5 generates ultrasound propagation attenuation information in the living body and attenuation image data. The color flow image generation unit 5-1-6 generates physical information (blood flow velocity, dispersion, intensity, and the like) and color flow image data based on Doppler measurement.

The ultrasound image information generation unit 5-1 may comprise an ultrasound image generation unit (not shown) that generates Doppler image data for temporally tracing the blood flow velocity, M-image data for tracing a motion at a predetermined position, tissue tracking image data in which a motion of a biological tissue is detected and tracked, and the like.

The lesion detection unit 5-2 comprises a mass lesion detection unit 5-2-1 and a calcified lesion detection unit 5-2-2. Each detection unit may output numerical information indicating the position of each lesion detected in the subject 2 and a range covered by each lesion.

Each detection unit constituting the lesion detection unit 5-2 may detect the lesion by using at least one or a combination of the following factors: (i) geometric image transformations such as an affine transformation, a scaling transformation, and a rotation transformation; (ii) edge enhancement processing and contrast enhancement processing; (iii) noise removal using an image filter; (iv) correction processing of eliminating influences such as body movements and probe operations; (v) segmentation processing of detecting lesions through edge detection, or probabilistic or morphological processing operations; (vi) pattern recognition with respect to a lesion model consisting of geometric information such as shapes or physical property information such as elasticity information; (vii) matching processing using correlation of feature amounts, statistical techniques, or combinations thereof; or (viii) machine learning processing using a convolutional neural network (CNN) trained with lesion images, or the like. The detection of the lesion is performed, for example, by generating numerical data for specifying a region where the lesion has occurred in the subject 2.

The mass lesion detection unit 5-2-1 detects a mass. The mass lesion detection unit 5-2-1 may detect the mass based on, for example, a characteristic echo pattern of the mass lesion. The characteristic echo pattern includes, for example, echo patterns showing nodular, mass-like, cystic, and the like. In addition, the mass lesion detection unit 5-2-1 may detect the mass based on a size (a diameter of 1 cm or more, 3 cm or less, or the like), a shape (round, oval, irregular, or the like), boundary clarity, and irregularities of a region where the mass is suspected. The mass lesion detection unit 5-2-1 may detect the mass based on the presence or absence of an internal echo in the B-mode image, the presence or absence of posterior echo enhancement, and the like indicated by the B-mode image data. The mass lesion detection unit 5-2-1 may detect the mass from non-linear information, strain information, elasticity information, attenuation information, blood flow information, and the like.

The calcified lesion detection unit 5-2-2 detects a calcified lesion. The calcified lesion detection unit 5-2-2 may detect the calcified lesion based on a characteristic echo pattern of the calcified lesion. The calcified lesion detection unit 5-2-2 may detect the calcified lesion based on a point-like echo, a boundary of a region where the calcified lesion is suspected, the presence or absence of an internal echo, the presence or absence of a posterior echo, and the like in the B-mode image indicated by the B-mode image data. The calcified lesion detection unit 5-2-2 may detect the calcified lesion from non-linear information, strain information, elasticity information, attenuation information, sound velocity information, and the like.

The ultrasound measurement information generation unit 5-3 comprises a mass lesion measurement unit 5-3-1 and a calcified lesion measurement unit 5-3-2. Each measurement unit may output various measured values for each lesion detected by each detection unit as the ultrasound measurement information.

Each measurement unit constituting the ultrasound measurement information generation unit 5-3 may measure feature amounts of the lesion for a lesion site, based on the following factors: (i) geometric attribute analysis for a diameter, a partition wall thickness, an area, and the like; (ii) structural or statistical texture analysis of the lesion; (iii) motion analysis such as hemodynamics, or temporal and spatial displacement amounts; (iv) analysis for an image and a signal indicating changes in information on the inside, the outside, or the boundary line periphery of the lesion (reflected echoes, biological non-linearity information, strain information, elasticity information, attenuation information, and velocity information); and the like.

The mass lesion measurement unit 5-3-1 measures the feature amount of the mass lesion detected by the mass lesion detection unit 5-2-1. The feature amount of the mass lesion is a numerical value or information indicating the feature of the mass lesion. The feature amount of the mass lesion includes a maximum diameter of the mass lesion, information indicating a mass occurrence location, the number of masses, information indicating a mammary structure, information indicating hemodynamics, the displacement amount, the strain information, the elasticity information, the attenuation information, the velocity information, information indicating a pattern within the mass, information indicating a pattern around the mass, boundary portion echo intensity, posterior echo intensity, and the like.

The calcified lesion measurement unit 5-3-2 measures the feature amount of the calcified lesion detected by the calcified lesion detection unit 5-2-2. The feature amount of the calcified lesion is a numerical value or information indicating the feature of the calcified lesion. The feature amount of the calcified lesion includes a diameter of the calcified lesion, information indicating a calcification occurrence location, the number, the elasticity information, the attenuation information, the velocity information, information indicating a calcification pattern, the boundary portion echo intensity, the posterior echo intensity, and the like.

Returning to FIG. 1, description will be provided. The lesion/risk information analysis unit 10 analyzes each lesion based on each ultrasound image data and each ultrasound measurement information obtained by the ultrasound information generation unit 5 and outputs analysis information indicating an analysis result to the mammary tumor risk determination unit 11. The lesion/risk information analysis unit 10 comprises a mass lesion analysis unit 10-1, a calcified lesion analysis unit 10-2, and a patient affliction risk analysis unit 10-3.

The mass lesion analysis unit 10-1 analyzes mass lesions including solid and cystic lesions. The calcified lesion analysis unit 10-2 analyzes the calcified lesion. The patient affliction risk analysis unit 10-3 analyzes an affliction risk of a patient from medical information regarding the patient read from the control panel 8. The medical information regarding the patient may be acquired by the patient affliction risk analysis unit 10-3 from an electronic medical chart, an analyzer, a picture archiving and communication system (PACS), another diagnostic device, or the like via a network.

Figure 3:
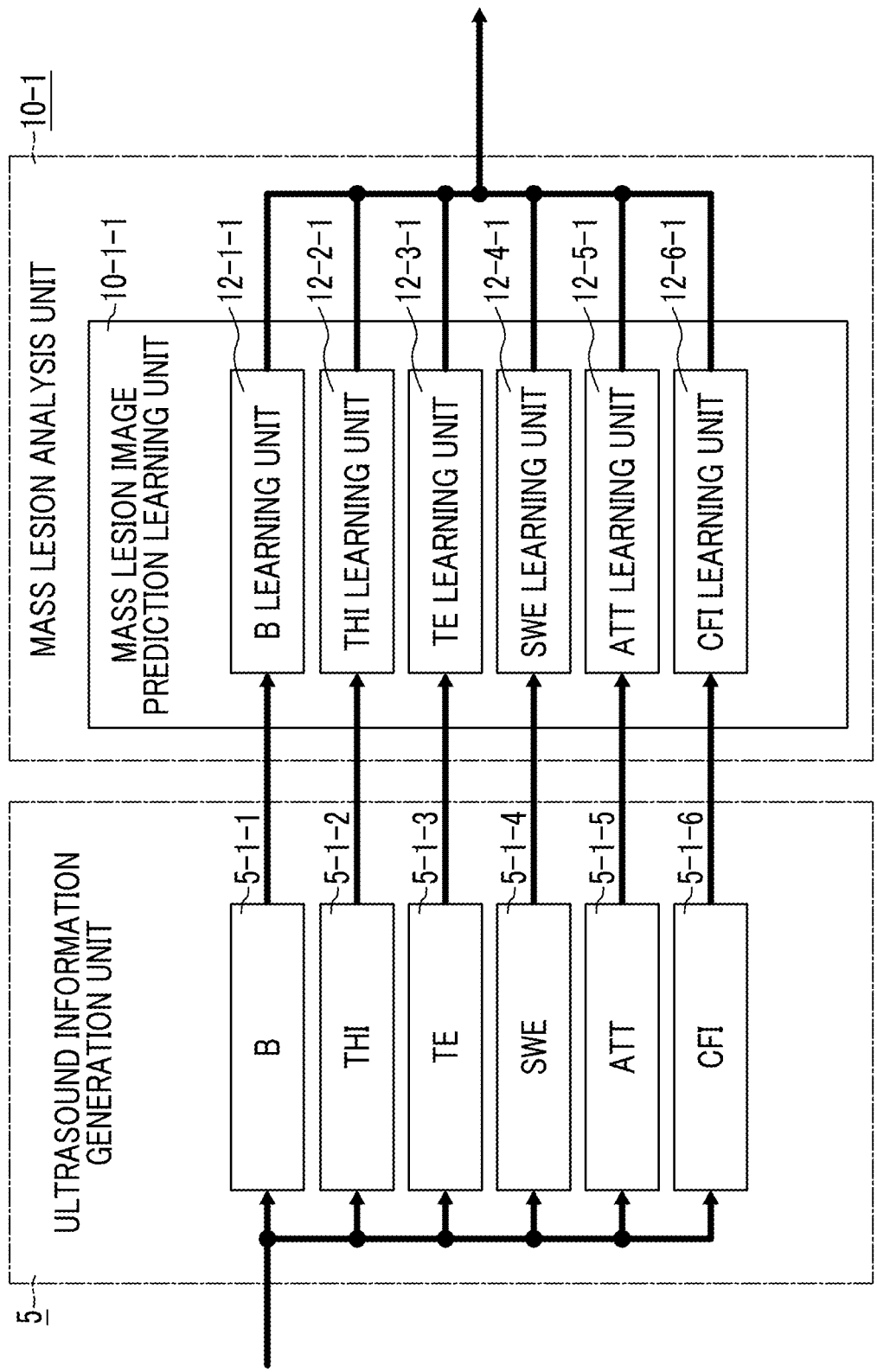
FIG. 3 is a diagram showing a configuration of a mass lesion analysis unit together with a part of components of the ultrasound information generation unit.
Figure 4:
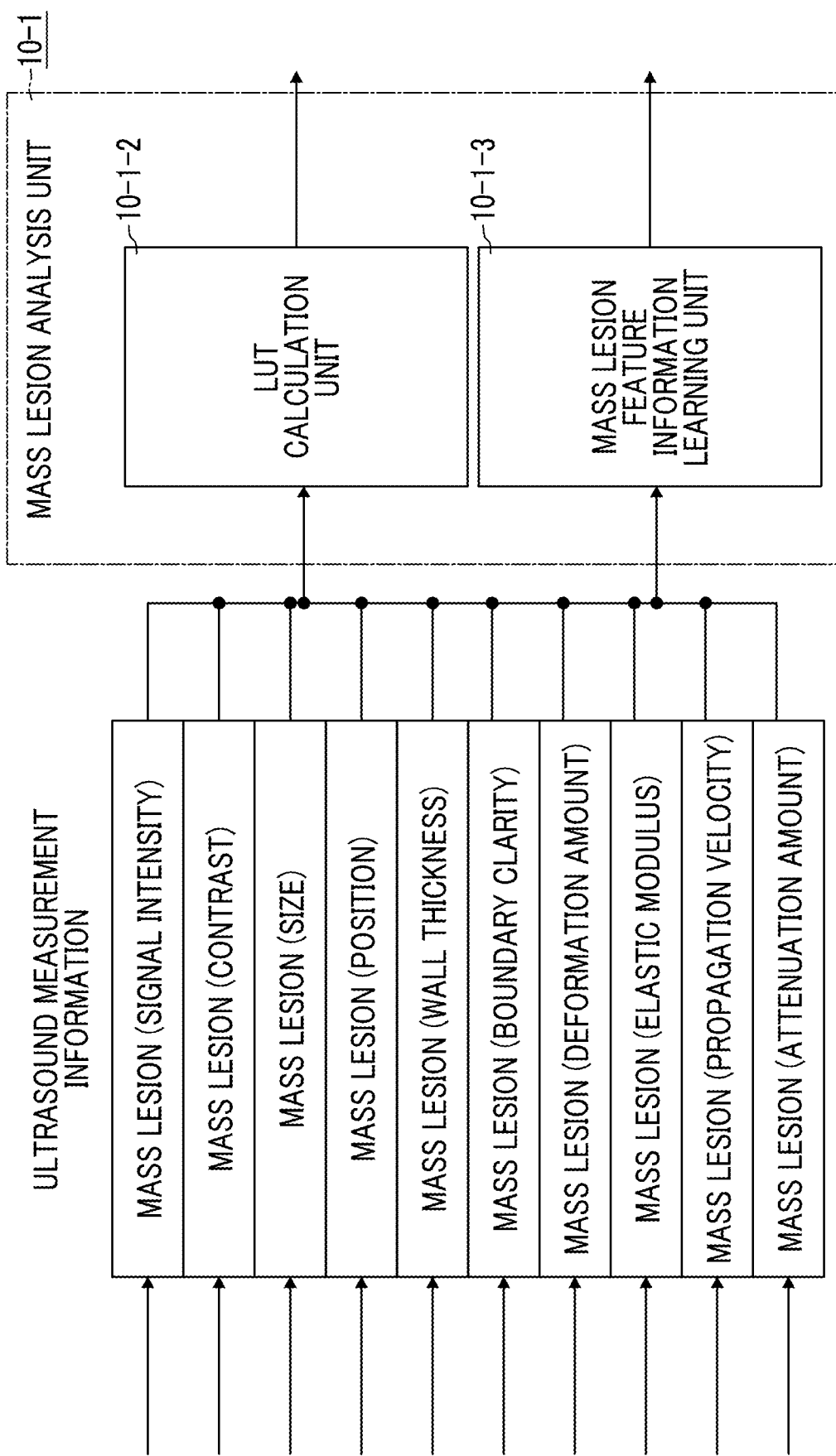
FIG. 4 is a diagram showing a configuration of the mass lesion analysis unit together with a part of components of the ultrasound information generation unit.
Figure 5A:
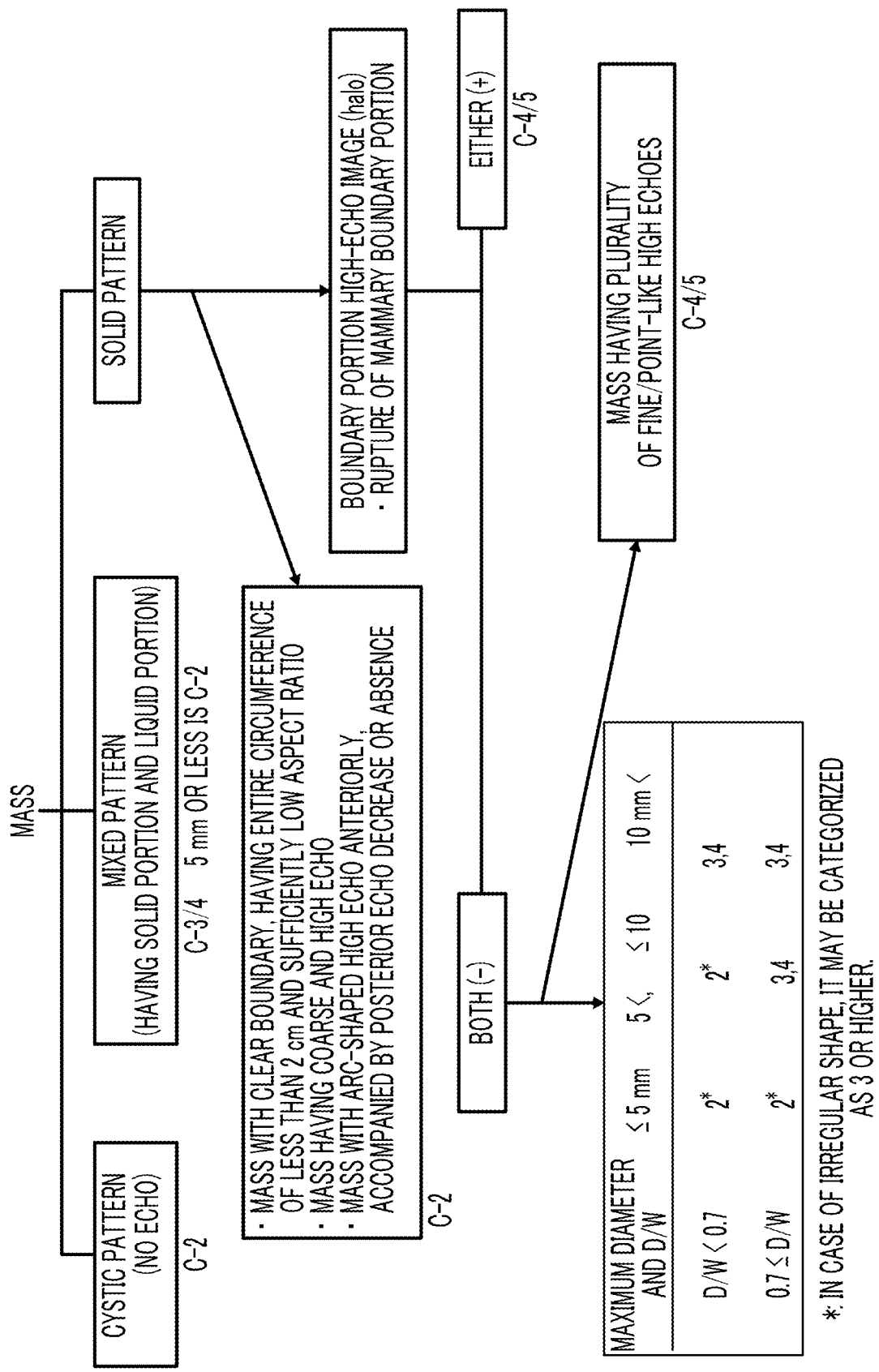
FIG. 5A is a flowchart showing a BI-RADS (Breast Imaging Reporting and Data System) category.
Figure 5B:
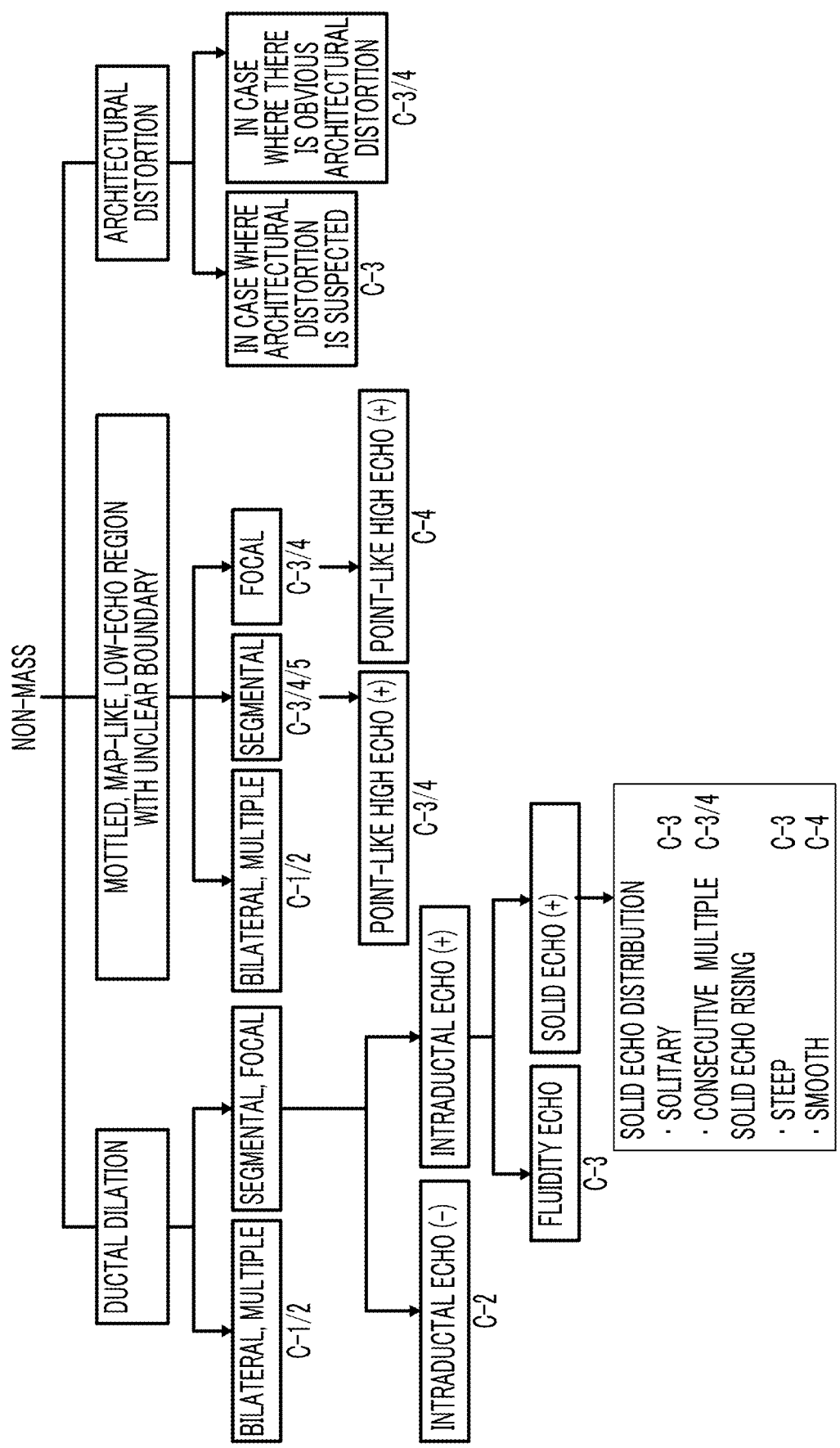
FIG. 5B is a flowchart showing the BI-RADS category.

FIGS. 3 and 4 show the configuration of the mass lesion analysis unit 10-1 together with a part of components of the ultrasound information generation unit 5. The mass lesion analysis unit 10-1 comprises a mass lesion image prediction learning unit 10-1-1, a LUT calculation unit 10-1-2, and a mass lesion feature information learning unit 10-1-3. The mass lesion image prediction learning unit 10-1-1 has a machine learning function such as a CNN that generates analysis information by analyzing the mass lesion from the ultrasound image data and the ultrasound measurement information generated by the ultrasound information generation unit 5. The LUT calculation unit 10-1-2 stores operational information based on statistical information of mass lesions, medical guidelines, and the like from the ultrasound measurement information generated by the ultrasound information generation unit 5, as a look-up table (LUT). Examples of the medical guidelines include the BI-RADS category, guidelines for breast cancer screening using ultrasound waves, and breast ultrasound diagnostic guidelines. In FIGS. 5A and 5B, the BI-RADS category is shown by a tree-like flowchart. It should be noted that medical guidelines vary from country to country. The LUT calculation unit 10-1-2 generates analysis information based on the look-up table. The mass lesion feature information learning unit 10-1-3 has a machine learning function such as a recurrent neural network (RNN) or a long short term memory (LSTM) and generates analysis information by estimating the prognosis of the mass lesion from continuous information.

The mass lesion image prediction learning unit 10-1-1 is composed of a plurality of machine learning units, each of which has a learning function, such as a CNN. The mass lesion image prediction learning unit 10-1-1 comprises a B learning unit 12-1-1 that learns B-mode images, a THI learning unit 12-2-1 that learns THI images, a TE learning unit 12-3-1 that learns TE images, an SWE learning unit 12-4-1 that learns SWE images, an ATT learning unit 12-5-1 that learns ATT images, and a CFI learning unit 12-6-1 that learns CFI images. Although not shown in FIG. 3, the mass lesion image prediction learning unit 10-1-1 may comprise a learning unit for ultrasound image data generated in another mode.

Here, the THI image, the TE image, the SWE image, the ATT image, and the CFI image refer to a tissue harmonic image, a tissue elastography image, a share wave elastography image, an attenuation image, and a color flow image, respectively.

Each learning unit has the following functions. That is, respective learning units use learning models constructed in advance to extract, as mass lesion information, at least any of: (i) echo patterns such as a mass diameter, an aspect ratio, cystic nature, mixed nature, and solid nature; (ii) mass shapes such as a round shape, a polygonal shape, a lobulated shape, an irregular shape, and an elliptical shape; (iii) internal echo information within the mass, such as uniformity and levels; (iv) boundary portion echo information such as echo intensity, smoothness, and a clarity degree of the boundary; (v) calcification information such as posterior echo information, the presence or absence of calcifications, and the number of calcifications; (vi) a mammary normal image tagged with the mass lesion information such as the presence or absence of intraductal progression, or prediction information such as lesion progression and treatment progress; or (vii) a mammary mass lesion image, from ultrasound images of a patient to be determined, that is, the B-mode image, the THI image, the TE image, the SWE image, the ATT image, and the CFI image, and, as analysis information, prediction information.

Each learning unit performs machine learning before the diagnosis of the subject 2 is performed. That is, each learning unit stores, as training data, a relationship between ultrasound image data and the analysis information obtained for the ultrasound image data, for each of a plurality of diagnoses or observations performed in the past on various subjects or phantoms, thereby constructing the learning model. This learning model may be a learning model from which the analysis information for new ultrasound image data can be obtained by providing the new ultrasound image data.

Here, by providing the learning unit for each ultrasound information and training the learning unit by using a feature image of the lesion extracted for each ultrasound information (information indicating the structure, the elasticity, the attenuation, the velocity, the enhancement, or the like), it is possible to accurately extract the mass lesion information, and the prediction information or the analysis information.

FIG. 4 shows the LUT calculation unit 10-1-2 and the mass lesion feature information learning unit 10-1-3. The LUT calculation unit 10-1-2 acquires the operational information based on the statistical information of the mass lesions, medical guidelines, and the like from the ultrasound measurement information generated by the ultrasound information generation unit 5, and stores the operational information as a look-up table. Evidence information stored in the LUT can be changed depending on the country or region.

The look-up table may be created in advance based on statistics based on past diagnosis results, or the like. The look-up table may be a table from which the analysis information can be obtained by providing the ultrasound measurement information generated by the ultrasound information generation unit 5.

The mass lesion feature information learning unit 10-1-3 has a machine learning function such as an RNN or an LSTM. The mass lesion feature information learning unit 10-1-3 performs machine learning before the diagnosis of the subject 2 is performed. That is, the mass lesion feature information learning unit 10-1-3 stores, as training data, a relationship between ultrasound measurement information and the analysis information obtained for the ultrasound measurement information, for each of a plurality of diagnoses or observations performed in the past on various subjects or phantoms, thereby constructing the learning model. This learning model may be a learning model from which the analysis information for new ultrasound measurement information can be obtained by providing the new ultrasound measurement information.

The mass lesion feature information learning unit 10-1-3 uses the learning model constructed in advance to extract the mass lesion information from continuous information of a patient to be determined, for example, a lesion follow-up observation period and lesion change information, and a treatment follow-up observation period and lesion change information, and, as the analysis information, the prediction information. The learning model constructed in advance may be constructed, for example, by learning continuous information tagged with various conditions, factors, and the like related to the measurement results for the lesion follow-up observation period and the lesion change information, and the treatment follow-up observation period and the lesion change information.

In FIG. 4, as the ultrasound measurement information generated by the ultrasound information generation unit 5, the signal intensity, contrast, size, position, wall thickness, boundary clarity, deformation amount, elastic modulus, propagation velocity of elastic waves, and attenuation amount of the mass lesion are shown as input information. This is an example of useful information narrowed down in mass lesion analysis. In addition, a configuration may be employed in which weighting coefficients are incorporated into numerical values indicated by the ultrasound measurement information according to the superiority of ultrasound measurement information. Regarding information combination or the like, optimization may be performed, for example, through reconstruction, optimization of the weighting coefficient, or the like using lesion information based on a final determination result.

Figure 6:
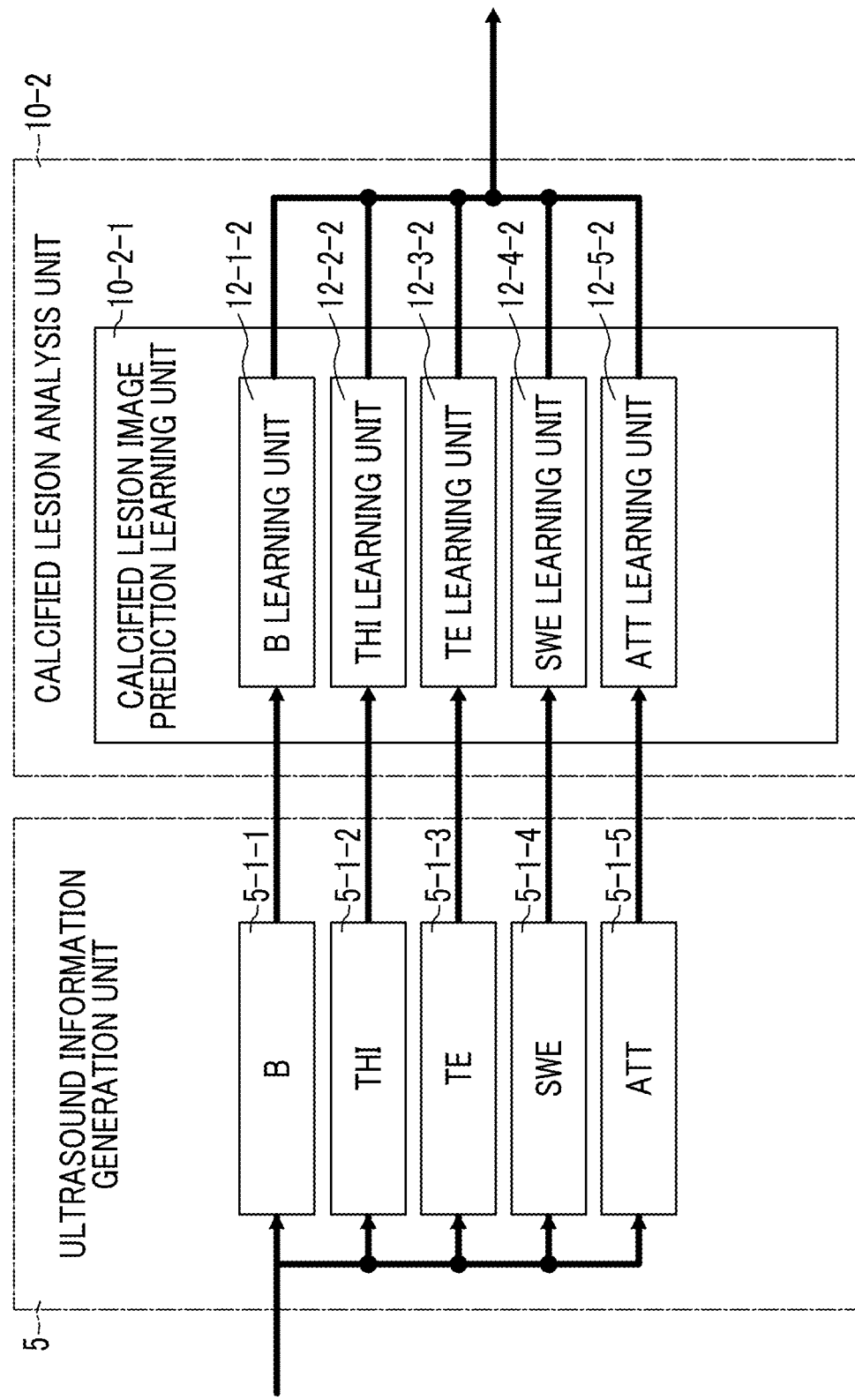
FIG. 6 is a diagram showing a configuration of a calcified lesion analysis unit together with a part of components of the ultrasound information generation unit.
Figure 7:
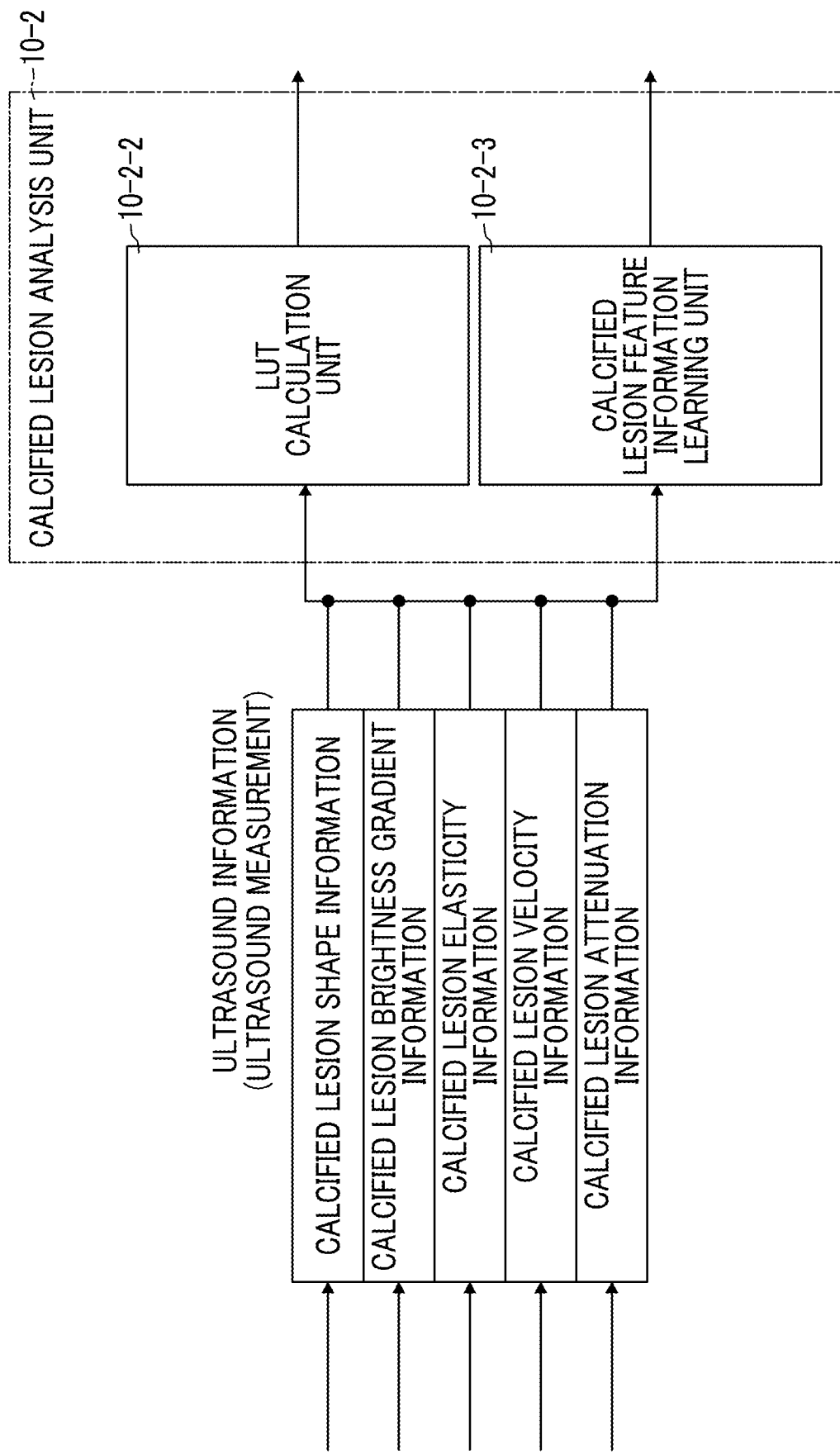
FIG. 7 is a diagram showing a configuration of the calcified lesion analysis unit together with a part of components of the ultrasound information generation unit.

FIGS. 6 and 7 show the configuration of the calcified lesion analysis unit 10-2 together with a part of components of the ultrasound information generation unit 5. The calcified lesion analysis unit 10-2 comprises a calcified lesion image prediction learning unit 10-2-1, a LUT calculation unit 10-2-2, and a calcified lesion feature information learning unit 10-2-3.

The calcified lesion image prediction learning unit 10-2-1 has a machine learning function such as a CNN that generates analysis information by analyzing the calcified lesion from the ultrasound image data and the ultrasound measurement information generated by the ultrasound information generation unit 5. The LUT calculation unit 10-2-2 acquires operational information based on statistical information of calcified lesions, medical guidelines, and the like from the ultrasound measurement information generated by the ultrasound information generation unit 5, and stores the operational information as a look-up table. The LUT calculation unit 10-2-2 generates analysis information based on the look-up table. The calcified lesion feature information learning unit 10-2-3 has a machine learning function such as an RNN or an LSTM and generates analysis information by estimating the prognosis of the calcified lesion from continuous information.

The calcified lesion image prediction learning unit 10-2-1 comprises a B learning unit 12-1-2 that learns B-mode images, a THI learning unit 12-2-2 that learns THI images, a TE learning unit 12-3-2 that learns TE images, an SWE learning unit 12-4-2 that learns SWE images, and an ATT learning unit 12-5-2 that learns ATT images. In the following description, for a B learning unit 12-1-$k$, a THI learning unit 12-2-$k$, a TE learning unit 12-3-$k$, an SWE learning unit 12-4-$k$, an ATT learning unit 12-5-$k$, and a CFI learning unit 12-6-1 ($k$=1 to 3) that have the same learning target, reference numerals are used without the "-$k$" at the end, and a comprehensive description including $k$=1 to 3 may be provided.

The calcified lesion image prediction learning unit 10-2-1 is different from the mass lesion image prediction learning unit 10-1-1 of which the analysis target is the mass lesion in that the analysis target is the calcified lesion. In addition, the calcified lesion image prediction learning unit 10-2-1 is different from the mass lesion image prediction learning unit 10-1-1 in that the CFI learning unit 12-6 is not provided. The calcified lesion image prediction learning unit 10-2-1 has the same configuration as the mass lesion image prediction learning unit 10-1-1 in other respects and executes the same processing.

The reason why the CFI learning unit 12-6 and related components may not be used in the analysis of the calcified lesion is as follows. That is, in the mass lesion, it is considered that there is a significant correlation between blood flow due to neovascularization and new growth, whereas there is comparatively less significant correlation regarding calcification due to necrosis. For example, in a case where there is medical significance such as a case where it is useful to distinguish benign calcifications due to the deposition of secretions within the mammary gland, it may be advantageous to have learning units corresponding to other operation modes.

The LUT calculation unit 10-2-2 and the calcified lesion feature information learning unit 10-2-3 shown in FIG. 7 are different from the LUT calculation unit 10-1-2 and the mass lesion feature information learning unit 10-1-3 of which the analysis targets are the mass lesions in that the analysis targets are the calcified lesions. In addition, the LUT calculation unit 10-2-2 and the calcified lesion feature information learning unit 10-2-3 have ultrasound measurement information to be input that is different from the LUT calculation unit 10-1-2 and the mass lesion feature information learning unit 10-1-3 of which the analysis targets are the mass lesions.

In FIG. 7, as the ultrasound measurement information that is generated by the ultrasound information generation unit 5 and input to the LUT calculation unit 10-2-2 and the calcified lesion feature information learning unit 10-2-3, calcified lesion shape information, calcified lesion brightness gradient information (contrast), calcified lesion elasticity information (elastic modulus), calcified lesion velocity information (propagation velocity of elastic waves), and calcified lesion attenuation information (attenuation amount) are shown. This is an example of useful information narrowed down in calcified lesion analysis. In addition, a configuration may be employed in which weighting coefficients are incorporated into numerical values indicated by the ultrasound measurement information according to the superiority of ultrasound measurement information. Regarding information combination or the like, for example, reconstruction or optimization of the weighting coefficient may be performed using lesion information based on a final determination result.

The LUT calculation unit 10-2-2 and the calcified lesion feature information learning unit 10-2-3 have the same configurations as the LUT calculation unit 10-1-2 and the mass lesion feature information learning unit 10-1-3 in other respects and execute the same processing.

Figure 8:
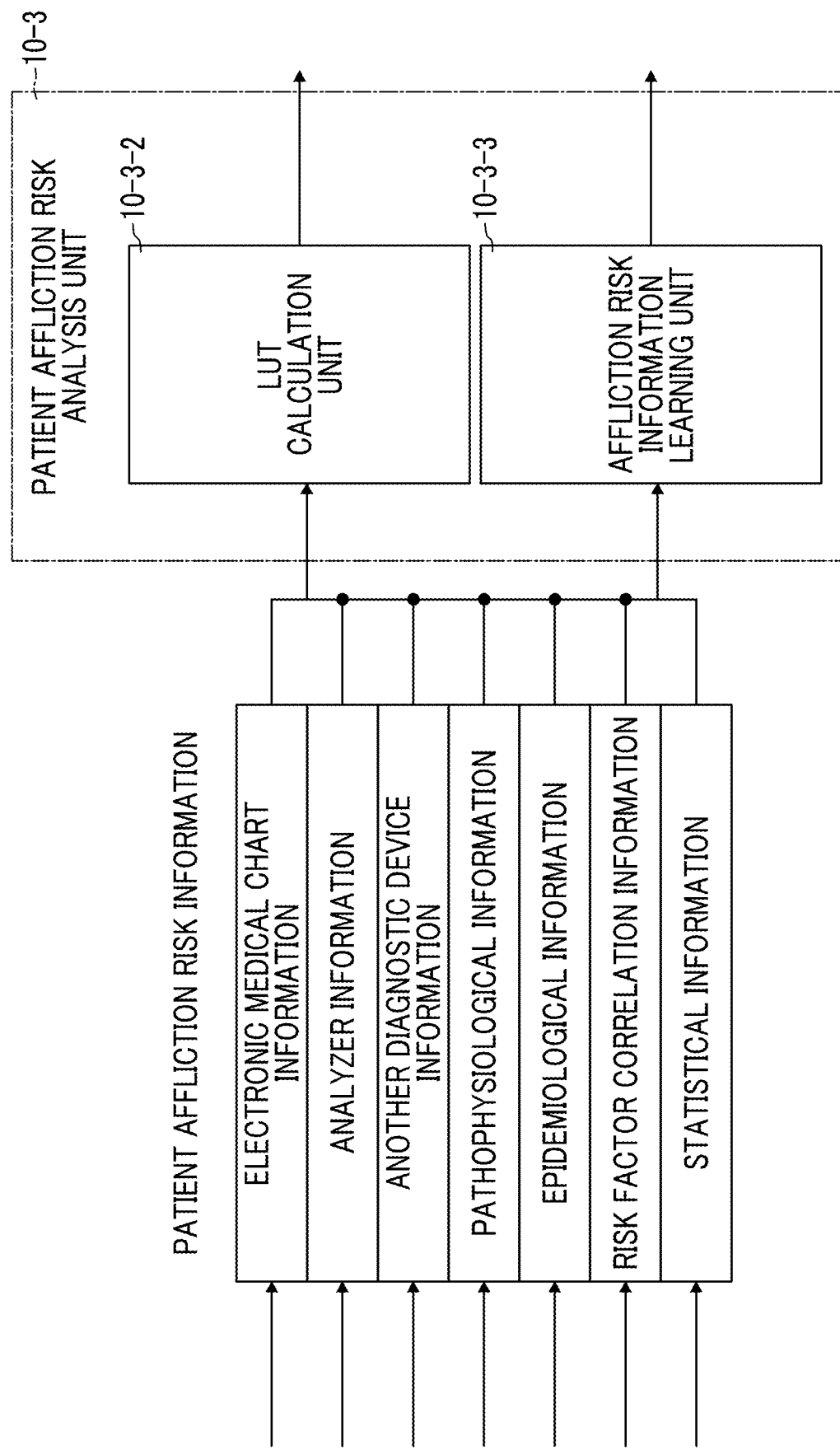
FIG. 8 is a diagram showing a configuration of a patient affliction risk analysis unit together with a part of components of the ultrasound information generation unit.

FIG. 8 shows the configuration of the patient affliction risk analysis unit 10-3 together with a part of components of the ultrasound information generation unit 5. The patient affliction risk analysis unit 10-3 comprises a LUT calculation unit 10-3-2 and an affliction risk information learning unit 10-3-3.

The LUT calculation unit 10-3-2 acquires a result of pathophysiological analysis, regional and environmental analysis, epidemiological analysis, correlation analysis with risk factors, statistical analysis, or biochemical analysis from the patient's medical information and stores the result as a look-up table. The LUT calculation unit 10-3-2 generates analysis information based on the look-up table. The patient's medical information includes patient hearing information such as age, height, weight, family medical history, and lifestyle and habits, physiological examination information such as blood and endocrine, genetic information such as tumor markers, other image diagnosis information, information on the patient's radiation treatment and drug therapy, and the like. The patient's medical information may be acquired by the patient affliction risk analysis unit 10-3 from an electronic medical chart, an analyzer, a picture archiving and communication system (PACS), another diagnostic device, or the like via a network. In addition, the control panel 8 may read the patient's medical information in response to the operation of the user, and the patient's medical information may be input to the patient affliction risk analysis unit 10-3 by the control panel 8 via the controller 7. The affliction risk information learning unit 10-3-3 performs learning analysis by using a patient affliction risk model constructed through machine learning on a neural network or the like and extracts the patient's mammary tumor affliction risk and the feature amount of the treatment effect as analysis information.

Returning to FIG. 1, description will be provided. The mammary tumor risk determination unit 11 comprehensively differentiates a mammary tumor based on each analysis information obtained from the lesion/risk information analysis unit 10 and performs progression degree prediction, determination on the treatment effect, treatment progress prediction, and the like. The mammary tumor risk determination unit 11 generates determination result information indicating a region covered by the mammary tumor in the subject 2, progression degree prediction, determination on the treatment effect, treatment progress prediction, and the like. The mammary tumor risk determination unit 11 comprehensively judges analysis information regarding the mass lesion, the calcified lesion, and the patient's medical information by using multimodal artificial intelligence (AI). Here, the multimodal AI refers to artificial intelligence that is constructed on a learning model based on a plurality of types of information in various aspects, such as image data, numerical data, text data, and audio data, and that derives a result based on the learning model.

The mammary tumor risk determination unit 11 performs machine learning by the multimodal AI before the diagnosis of the subject 2 is performed. That is, the mammary tumor risk determination unit 11 stores, as training data, a relationship between the analysis information and diagnosis result information, for each of a plurality of diagnoses or observations performed in the past on various subjects or phantoms, thereby constructing the learning model. This learning model may be a learning model from which the diagnosis result information for new analysis information obtained from the lesion/risk information analysis unit 10 can be obtained by providing the new analysis information.

The mammary tumor risk determination unit 11 may use the learning model such as the multimodal AI, but may perform some determinations through a look-up table, operations, or the like. By extracting appropriate information from various types of information and then using the learning model that has learned these pieces of information, high-precision determination is achieved.

Further, the numerical information may be obtained through the look-up table that stores a result based on, for example, a statistical calculation result in advance, or an operation of performing statistical arithmetic calculation from numerical calculation such as subtraction, squaring, or integration. The prediction calculation or the like in continuous signal information may be performed by an RNN, an LSTM, or the like. In addition, the image analysis may be performed by a CNN or the like. High-precision analysis is performed by appropriately selecting respective learning models suitable for analysis and a combination of these.

The display controller 9 generates image data indicating an image of the determination result based on each ultrasound image data and each ultrasound measurement information output from the ultrasound information generation unit 5 and the determination result information output from the mammary tumor risk determination unit 11. The display controller 9 generates a video signal based on the image data and outputs the video signal to the display unit 6. The display unit 6 may be a monitor composed of an organic EL (electro-luminescent) display, a CRT (cathode ray tube) display, a liquid crystal display, or the like. The display unit 6 displays the image showing the determination result based on the video signal.

Figure 9:
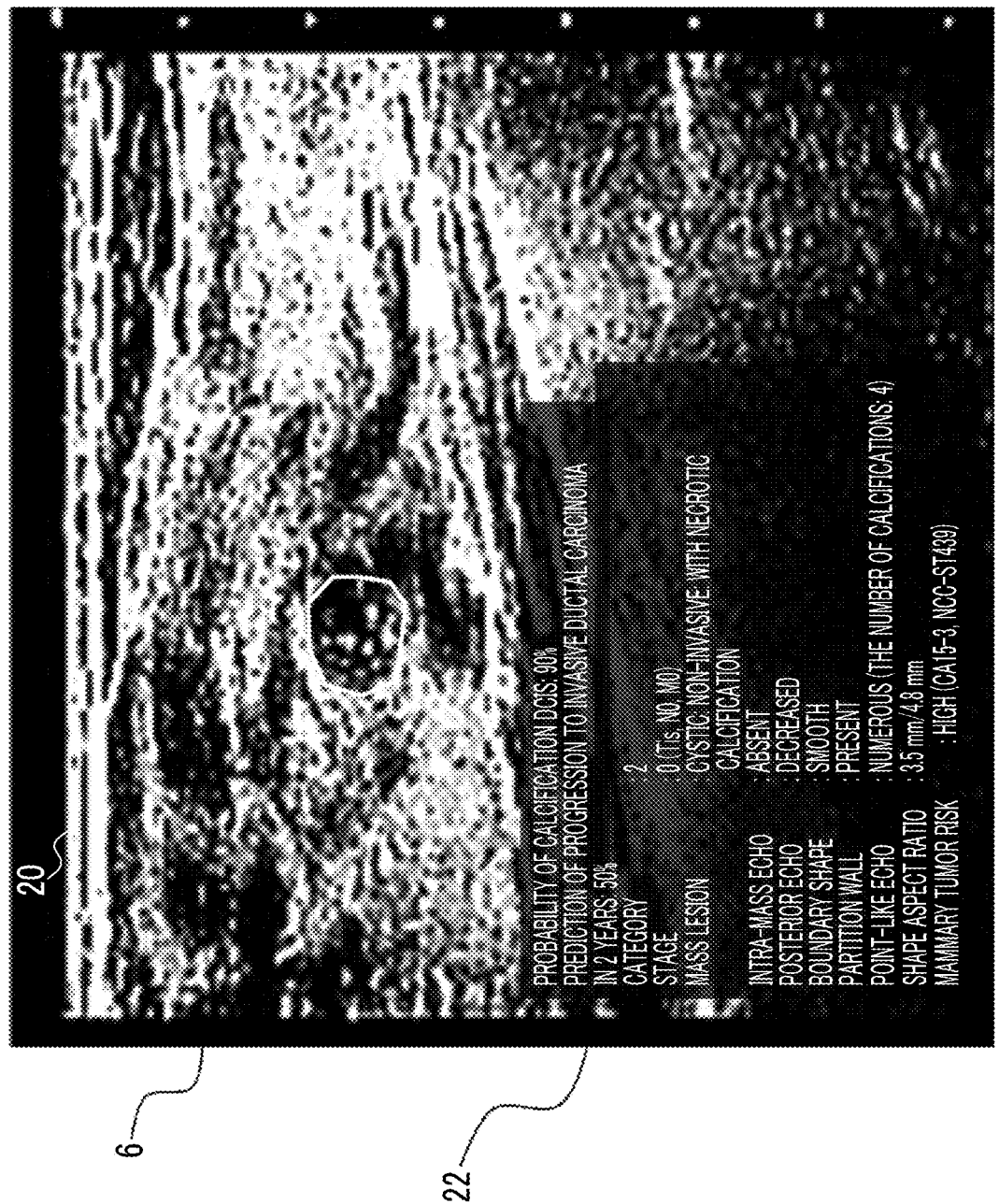
FIG. 9 is a diagram showing an example of an image displayed on a display unit.

FIG. 9 shows an example of the image displayed on the display unit 6. The display unit 6 shows a determination result 22 together with a B mode image 20. In the example shown in FIG. 9, the region where the lesion is recognized is indicated by a line drawing a substantially round shape, and the determination result 22 is displayed in text. The determination result is displayed as follows.

"Probability of calcification DCIS: 90%", "Prediction of progression to invasive ductal carcinoma in 2 years: 50%", "Category: 2", "Stage: 0 (Tis, N0, M0)", "Mass lesion: cystic: non-invasive: with necrotic calcification", "Intramass echo: absent", "Posterior echo: decreased", "Boundary shape: smooth", "Partition wall: present", "Point-like echo: numerous (the number of calcifications: 4)", "Shape aspect ratio: 3.5 mm/4.8 mm", and "mammary tumor risk: high (CA15-3, NCC-ST439)".

The above-described embodiment shows a determination result useful for a doctor to diagnose a lesion. The ultrasound diagnostic apparatus 100 may select and display information particularly useful for diagnosis from among a large amount of ultrasound information. Although FIG. 9 shows an example of numerical notation by text, an indicator such as a correlation graph or a color bar may be displayed.

Figure 10A:
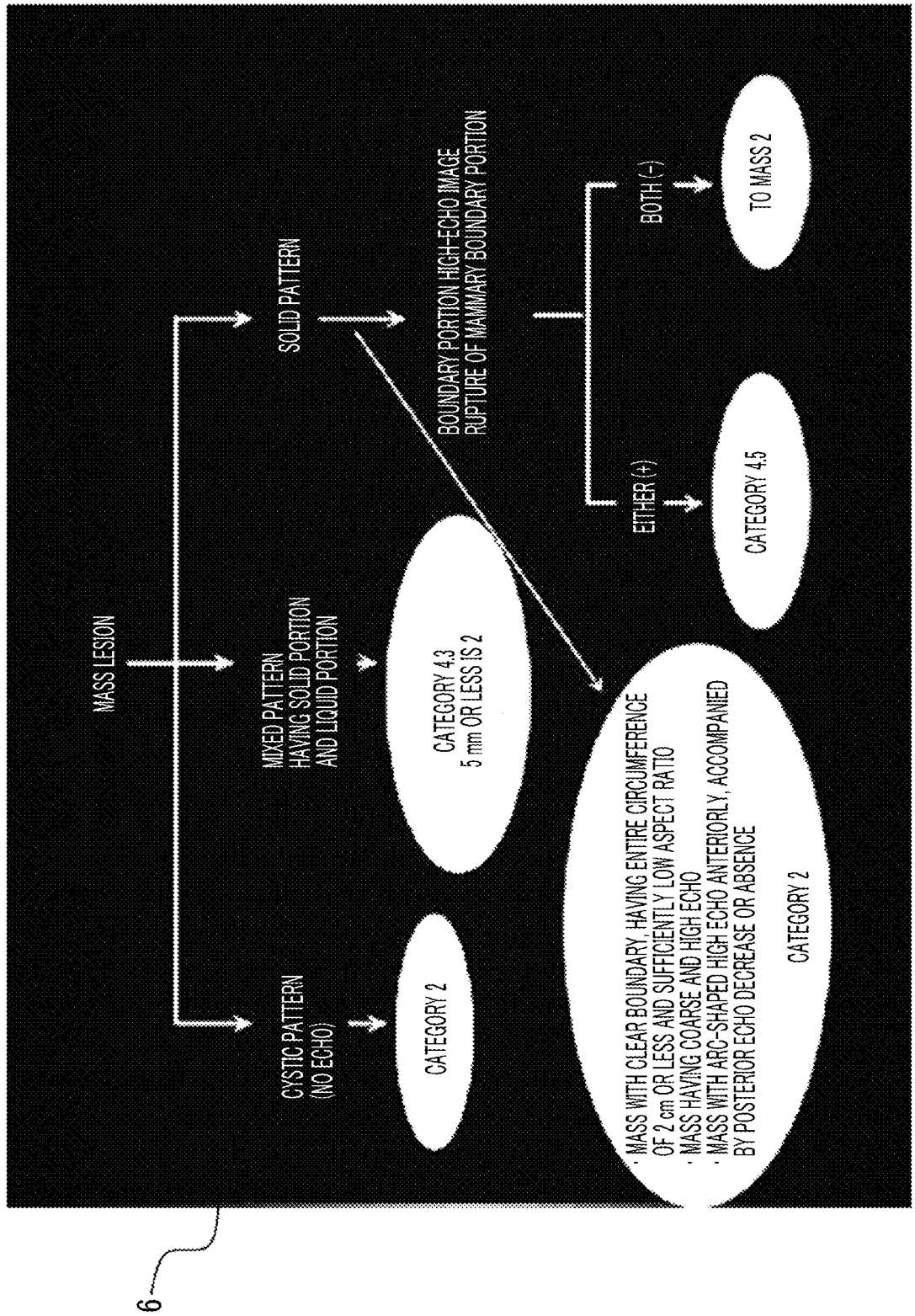
FIG. 10A is a diagram showing an example of a flowchart displayed on the display unit.
Figure 10B:
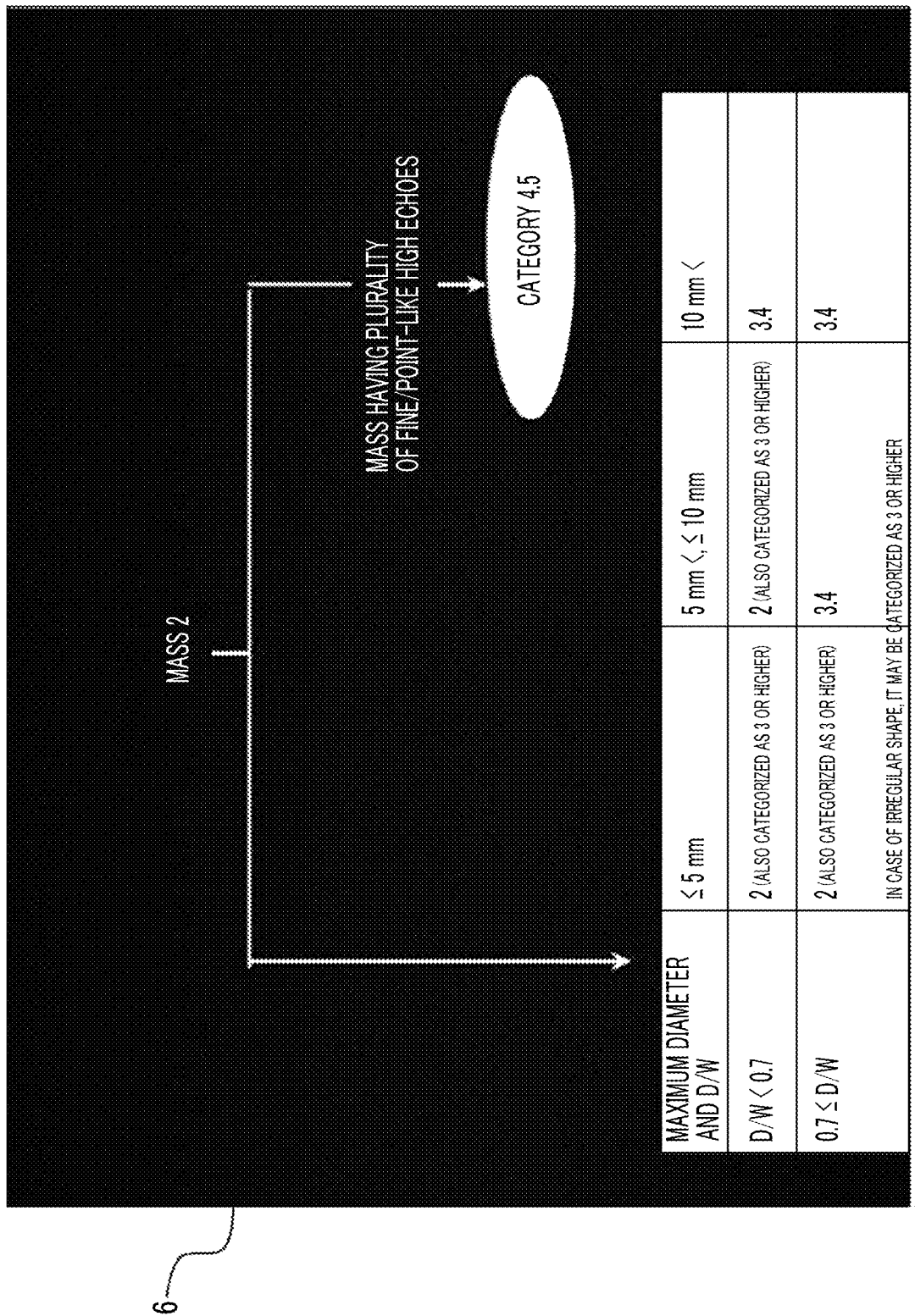
FIG. 10B is a diagram showing an example of a flowchart displayed on the display unit.

In addition, for example, a flowchart for judgment based on diagnostic guidance may be displayed. This flowchart may be displayed by being overlaid with an ultrasound diagnostic image. FIGS. 10A and 10B show examples in which flowcharts following the BI-RADS categories are displayed on the display unit 6.

In addition, the ultrasound diagnostic apparatus 100 has an input function that allows changes in a category or a state of the lesion based on the doctor's judgment, and may re-process probability calculations, estimation calculations, or the like based on the category or the state of the lesion judged by the doctor and may correct the result.

As described above, the ultrasound diagnostic apparatus 100 according to the present embodiment comprises the ultrasound transmission and reception unit 4 that transmits and receives ultrasound waves to and from the subject 2 through the ultrasound probe 3 and generates the reception signal. In addition, the ultrasound diagnostic apparatus 100 comprises the ultrasound information generation unit 5 that generates a plurality of types of ultrasound information based on the reception signal. The ultrasound information includes the ultrasound image data and the ultrasound measurement information. The ultrasound measurement information may be numerical data. The ultrasound image data according to the present embodiment includes image data indicating a B-mode image, a THI image, a TE image, an SWE image, an ATT image, or a CFI image.

The ultrasound diagnostic apparatus 100 comprises the lesion detection unit 5-2 and the ultrasound measurement information generation unit 5-3 as a detection and measurement unit that detects and measures the lesion based on the plurality of types of ultrasound information. In addition, the ultrasound diagnostic apparatus 100 comprises the lesion/ risk information analysis unit 10 as an analysis unit that analyzes a state of the lesion based on a measurement result obtained by the detection and measurement unit.

The detection and measurement unit may comprise at least one of a mass lesion detection and measurement unit that detects and measures a mass lesion, or a calcified lesion detection and measurement unit that detects and measures a calcified lesion.

Here, the mass lesion detection and measurement unit is composed of the mass lesion detection unit 5-2-1 and the mass lesion measurement unit 5-3-1. The calcified lesion detection and measurement unit is composed of the calcified lesion detection unit 5-2-2 and the calcified lesion measurement unit 5-3-2. The detection and measurement unit detects and measures at least one of a precancerous lesion or a breast cancer as the lesion, and the analysis unit analyzes the state of at least one of the precancerous lesion or the breast cancer as the lesion.

The lesion/risk information analysis unit 10 as the analysis unit comprises a plurality of types of learning units that analyze the state of the lesion by applying a plurality of types of ultrasound image data to a learning model constructed in advance. As the plurality of types of learning units, there are the B learning unit 12-1-$k$, the THI learning unit 12-2-$k$, the TE learning unit 12-3-$k$, the SWE learning unit 12-4-$k$, the ATT learning unit 12-5-$k$, and the CFI learning unit 12-6-1 ($k=1$ or 2).

The lesion/risk information analysis unit 10 as the analysis unit may output the analysis information by analyzing the state of the lesion based on at least one of a LUT calculation unit that analyzes the state of the lesion based on a look-up table acquired in advance, or a machine learning analysis unit that analyzes the state of the lesion based on a learning model constructed in advance. The LUT calculation unit includes LUT calculation units 10-1-2 and 10-2-2, which are provided in the mass lesion analysis unit 10-1 and the calcified lesion analysis unit 10-2, respectively. The machine learning analysis unit includes the mass lesion feature information learning unit 10-1-3 and the calcified lesion feature information learning unit 10-2-3, which are provided in the mass lesion analysis unit 10-1 and the calcified lesion analysis unit 10-2, respectively.

With the ultrasound diagnostic apparatus 100 according to the present embodiment, machine learning is performed before the diagnosis of the subject 2 is performed. That is, the relationship between the ultrasound information and the analysis information obtained for the ultrasound information is stored as training data for each of a plurality of diagnoses or observations performed in the past on various subjects or phantoms, and a learning model is constructed. In addition, the look-up table is created in advance based on statistics based on past diagnosis results, or the like.

The lesion/risk information analysis unit 10 outputs the analysis information by analyzing the state of the lesion based on at least one of a LUT calculation unit that analyzes the state of the lesion based on the look-up table, or a machine learning analysis unit that analyzes the state of the lesion based on the learning model. The mammary tumor risk determination unit 11 generates the diagnosis result information based on the analysis information. This reduces the effort required to obtain the diagnosis result for the lesion and enhances the objectivity of the diagnosis result. In addition, the use of the look-up table reduces the amount of information to be processed as compared with a case of using only the machine learning analysis unit.

The lesion/risk information analysis unit 10 as the analysis unit may perform progression degree prediction of the lesion. The display controller 9 may display the progression degree prediction of the lesion on the display unit 6, or may display the progression degree prediction of the lesion and a cause leading to the prediction on the display unit 6.

The lesion/risk information analysis unit 10 as the analysis unit may perform determination on the treatment effect and further perform prediction on the treatment progress. The display controller 9 may display information obtained by performing determination on the treatment effect and further performing prediction on the treatment progress on the display unit 6, or may display, on the display unit 6, the information obtained by performing determination on the treatment effect and performing prediction on the treatment progress, and a cause leading to the determination of the treatment effect and to the prediction of the treatment progress.

In the above description, an embodiment has been described in which analysis is performed for the mass lesion and the calcified lesion. In a case where there is a medical determination item other than this, the analysis target is not limited thereto. For example, a learning model of the liver may be used to determine whether or not liver cancer has progressed from the ultrasound diagnostic image. In this case, tumorous lesions, fibrotic lesions, fatty liver, and the like may be detected by the lesion detection unit 5-2, measured by the ultrasound measurement information generation unit 5-3, and analyzed by the lesion/risk information analysis unit 10. In addition, a learning model of other biological tissues may be used to determine whether or not cancer has progressed in the biological tissues from the ultrasound diagnostic image. Further, there are other medical guidelines for the mammary tumor having no mass, and the like, and detection algorithms based on the medical guidelines may be used in the present disclosure.

In the above description, it has been described that analysis is performed based on each ultrasound information with the configuration of the mass lesion analysis unit 10-1, the calcified lesion analysis unit 10-2, and the patient affliction risk analysis unit 10-3 according to the embodiment of the present disclosure, but it is not necessary to use all of these analysis units and all of the ultrasound information. Depending on the state of the lesion, measurement, calculation, and analysis processing may be limited to a range in which analysis based on the ultrasound information that can provide sufficient determination can be conducted, and unnecessary processing may be halted, the weighting of the processing result may be changed, or the like, thereby streamlining and speeding up the determination processing. In addition, the ultrasound information to be used and the content of the processing used for determination may be changed based on the doctor's judgment.

Medical guidelines vary by country or region. Depending on the differences by country or region, rearranging the configurations or the techniques and changing the display contents, which can be implemented in the contents described in the present disclosure, are also included in the scope of the claims. Furthermore, medical guidelines are constantly evolving with new factors being added each year. In this case as well, a new ultrasound diagnosis mode and an ultrasound measurement technique may be implemented in the present disclosure.

For example, other image diagnostic apparatuses such as mammography (MMG) or magnetic resonance imaging (MRI), and analyzers may be added to the present disclosure. This provides more judgment materials for the doctor, which results in increased diagnostic accuracy. Information generated by other image diagnostic apparatuses or analyzers may be incorporated into the ultrasound diagnostic apparatus 100 via electrical communication lines, such as the Internet.

Configuration of Present Disclosure

The present disclosure may have the following configurations.

Configuration 1:
An ultrasound diagnostic apparatus comprising:
an ultrasound information generation unit that generates a plurality of types of ultrasound information based on transmission and reception of ultrasound waves with respect to a subject;
a detection and measurement unit that detects and measures a lesion based on the plurality of types of ultrasound information; and
an analysis unit that analyzes a state of the lesion based on a measurement result obtained by the detection and measurement unit,
in which the detection and measurement unit
detects and measures at least one of a precancerous lesion or a breast cancer as the lesion, and
the analysis unit
analyzes a state of at least one of the precancerous lesion or the breast cancer as the lesion.

Configuration 2:
The ultrasound diagnostic apparatus according to Configuration 1,
in which the detection and measurement unit includes at least one of
a mass lesion detection and measurement unit that detects and measures a mass lesion, or
a calcified lesion detection and measurement unit that detects and measures a calcified lesion.

Configuration 3:
The ultrasound diagnostic apparatus according to Configuration 1 or 2,
in which the ultrasound information includes a plurality of types of ultrasound image data generated in different modes, and
the analysis unit
analyzes the state of the lesion by applying the plurality of types of ultrasound image data to a learning model constructed in advance.

Configuration 4:
The ultrasound diagnostic apparatus according to any one of Configurations 1 to 3,
in which the analysis unit
analyzes the state of the lesion based on at least one of
a LUT calculation unit that analyzes the state of the lesion based on a look-up table acquired in advance, or a machine learning analysis unit that analyzes the state of the lesion based on a learning model constructed in advance.

Configuration 5:
The ultrasound diagnostic apparatus according to any one of Configurations 1 to 4,
in which the analysis unit
performs progression degree prediction of the lesion.

Configuration 6:
The ultrasound diagnostic apparatus according to Configuration 5, further comprising:
a display controller,
in which the display controller
displays the progression degree prediction of the lesion on a display unit, or
displays the progression degree prediction of the lesion and a cause leading to the prediction on the display unit.

Configuration 7:
The ultrasound diagnostic apparatus according to any one of Configurations 1 to 6,
in which the analysis unit
performs determination on a treatment effect and further performs prediction on a treatment progress.

Configuration 8:
The ultrasound diagnostic apparatus according to Configuration 7, further comprising:
a display controller,
in which the display controller
displays information obtained by performing determination on the treatment effect and further performing prediction on the treatment progress on a display unit, or
displays, on the display unit, the information obtained by performing determination on the treatment effect and performing prediction on the treatment progress, and a cause leading to the determination of the treatment effect and to the prediction of the treatment progress.

Configuration 9:
The ultrasound diagnostic apparatus according to any one of Configurations 1 to 8,
in which the ultrasound information
includes data indicating at least one of a B-mode image, a tissue harmonic image, a tissue elastography image, a share wave elastography image, an attenuation image, or a color flow image.

What is claimed is:

1. An ultrasound diagnostic apparatus comprising one or more processors configured to:
generate a plurality of types of ultrasound information based on transmission and reception of ultrasound waves with respect to a subject, the ultrasound information including a plurality of types of ultrasound image data generated in different modes;
detect and measure a lesion, including at least one of a precancerous lesion or a breast cancer, based on the plurality of types of ultrasound information, to obtain a measurement result; and
analyze a state of the lesion, based on the measurement result and by applying the plurality of types of ultrasound image data generated in the different modes to a learning model constructed by machine learning in advance, and generate analysis information estimating a prognosis of the lesion.

2. The ultrasound diagnostic apparatus according to claim 1, wherein
the one or more processors are further configured to perform at least one of detection and measurement of a mass lesion, or detection and measurement of a calcified lesion.

3. The ultrasound diagnostic apparatus according to claim 1, wherein
the one or more processors are further configured to analyze the state of the lesion based on a look-up table acquired in advance.

4. The ultrasound diagnostic apparatus according to claim 1, wherein the one or more processors are further configured to perform progression degree prediction of the lesion.

5. The ultrasound diagnostic apparatus according to claim 4, further comprising:
a display controller, wherein the display controller displays the progression degree prediction of the lesion on a display, or displays the progression degree prediction of the lesion and a cause leading to the prediction on the display.

6. The ultrasound diagnostic apparatus according to claim 4, wherein the one or more processors are further configured to generate additional analysis information regarding the progression degree prediction of the lesion by comprehensively judging the additional analysis information regarding one or more pieces of the lesion information and a patient's medical information by using multimodal artificial intelligence (AI).

7. The ultrasound diagnostic apparatus according to claim 4, wherein the one or more processors are further configured to generate additional analysis information regarding the progression degree prediction of the lesion by using (a) a look-up table that stores a result based on a statistical calculation result, (b) statistical arithmetic calculation, (c) a learning model suitable for analysis processing or prediction processing, or (d) any combination of the look-up table, the statistical arithmetic calculation, and the learning model, the analysis processing includes a convolutional neural network (CNN), and the prediction processing includes a recurrent neural network (RNN) or a long short term memory (LSTM).

8. The ultrasound diagnostic apparatus according to claim 1, wherein the one or more processors are further configured to perform determination on a treatment effect and perform prediction on a treatment progress.

9. The ultrasound diagnostic apparatus according to claim 8, further comprising:

a display controller, wherein the display controller displays information obtained by performing determination on the treatment effect and further performing prediction on the treatment progress on a display, or displays, on the display, the information obtained by performing determination on the treatment effect and performing prediction on the treatment progress, and a cause leading to the determination of the treatment effect and to the prediction of the treatment progress.

10. The ultrasound diagnostic apparatus according to claim 8, wherein the one or more processors are further configured to determine the treatment effect and predict the treatment progress by comprehensively judging additional analysis information regarding one or more pieces of lesion information and a patient's medical information by using multimodal artificial intelligence (AI).

11. The ultrasound diagnostic apparatus according to claim 8, wherein the one or more processors are further configured to generate additional analysis information regarding progression degree prediction of the lesion by using (a) a look-up table that stores a result based on a statistical calculation result, (b) statistical arithmetic calculation, (c) a learning model suitable for analysis processing or prediction processing, or (d) any combination of the look-up table, the statistical arithmetic calculation, and the learning model, the analysis processing includes a convolutional neural network (CNN), and the prediction processing includes a recurrent neural network (RNN) or a long short term memory (LSTM).

12. The ultrasound diagnostic apparatus according to claim 1, wherein the ultrasound information includes data indicating at least one of a B-mode image, a tissue harmonic image, a tissue elastography image, a share wave elastography image, an attenuation image, or a color flow image.

13. The ultrasound diagnostic apparatus according to claim 1, wherein the one or more processors obtains the measurement result by using at least pattern recognition with respect to a lesion model consisting of geometric information or physical property information.

14. The ultrasound diagnostic apparatus according to claim 1, wherein the learning model is constructed in advance to extract, as mass lesion information, at least calcification information indicating a presence or absence of calcifications, and a mammary mass lesion image.

15. The ultrasound diagnostic apparatus according to claim 1, wherein the learning model is constructed in advance based on a relationship between target ultrasound image data and the analysis information obtained for the target ultrasound image data, for each of a plurality of diagnoses or observations performed in the past.

* * * * *